(12) United States Patent
Vingralek

(10) Patent No.: US 7,814,064 B2
(45) Date of Patent: Oct. 12, 2010

(54) DYNAMIC DISTRIBUTED CONSENSUS ALGORITHM

(75) Inventor: Radek Vingralek, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 742 days.

(21) Appl. No.: 10/845,286

(22) Filed: May 12, 2004

(65) Prior Publication Data

US 2005/0256824 A1    Nov. 17, 2005

(51) Int. Cl.
G06F 7/00      (2006.01)
G06F 17/30     (2006.01)

(52) U.S. Cl. .................................... 707/674; 707/687
(58) Field of Classification Search ................ 707/201, 707/674, 687, 999.201
See application file for complete search history.

(56) References Cited

U.S. PATENT DOCUMENTS

| | | | | |
|---|---|---|---|---|
| 6,148,349 | A * | 11/2000 | Chow et al. | 710/33 |
| 6,223,252 | B1 * | 4/2001 | Bandera et al. | 711/114 |
| 6,438,705 | B1 * | 8/2002 | Chao et al. | 714/4 |
| 6,587,860 | B1 * | 7/2003 | Chandra et al. | 707/202 |
| 6,938,084 | B2 * | 8/2005 | Gamache et al. | 709/226 |
| 7,111,147 | B1 * | 9/2006 | Strange et al. | 711/209 |
| 7,275,100 | B2 * | 9/2007 | Yamagami | 709/224 |
| 2004/0078654 | A1 * | 4/2004 | Holland et al. | 714/13 |
| 2005/0021574 | A1 * | 1/2005 | Miller et al. | 707/204 |
| 2005/0033933 | A1 * | 2/2005 | Hetrick et al. | 711/165 |

OTHER PUBLICATIONS

Agrawal, D. et al. "An Efficient and Fault-Tolerant Solution for Distributed Mutual Exclusion" ACM Transactions on Computer Systems, Feb. 1991, vol. 9, No. 1, pp. 1-20.
Agrawal, D. et al. "The Generalized Tree Quorum Protocol: An Efficient Approach for Managing Replicated Data" ACM Transactions on Computer Systems, Dec. 1992, vol. 17, No. 4, pp. 689-717.
Agrawal, "Failure Detection and Consensus in the Crash-Recovery Model" Technical Report, Jul. 27, 1999, pp. 1-42, Cornell University, Ithaca, NY.
Agrawal, D. et al. "Failure Detection and Consensus in the Crash-Recovery Model" Distributed Computing, Apr. 2000, vol. 13, No. 2, pp. 99-125.
Aspnes, J. "Fast Deterministic Consensus in a Noisy Environment" Proceedings of the 19th Annual ACM Symposium on Principles of Distributed Computing (PODC '00), Portland, OR, Jul., 2000, pp. 299-308.
Barborak, M. et al. "The Consensus Problem in Fault-Tolerant Computing" ACM Computing Surveys, Jun. 1993, vol. 25, No. 2, pp. 172-220.

(Continued)

Primary Examiner—John R. Cottingham
Assistant Examiner—Kimberly Lovel
(74) Attorney, Agent, or Firm—Vista IP Law Group, LLP.

(57) ABSTRACT

A method and apparatus for data management are disclosed. Data from a first storage device from a subset of a plurality of storage devices is relocated to a second storage device from the plurality of storage devices upon unavailability of the first storage device during a data operation. Each storage device from the subset of the plurality of storage devices includes a data replica. Status parameters on each storage device are updated, wherein a subset of the status parameters indicates addition of the second storage device to the plurality of storage devices.

35 Claims, 9 Drawing Sheets

OTHER PUBLICATIONS

Bernstein, P.A. "The Failure and Recovery Problem for Replicated Databases" Proceedings of the 2nd Annual ACM Symposium on Principles of Distributed Computing (PODC '83). Aug. 1983, pp. 114-122.

Boichat, R. et al. "Deconstructing Paxos" ACM SIGACT News, Mar. 2003, vol. 34, No. 1, pp. 47-67.

Chandra, T.D. et al. "Unreliable Failure Detectors for Reliable Distributed Systems" Journal of the ACM, Mar. 1996, vol. 43, No. 2, pp. 225-267.

Chor, B. et al. "Simple Constant-Time Consensus Protocols in Realistic Failure Models" Journal of the Association of Computing Machinery, Jul. 1989, vol. 36, No. 3, pp. 591-614.

Gartner, F.C. "Fundamentals of Fault-Tolerant Distributed Computing in Asynchronous Environments" ACM Computing Surveys, Mar. 1999, vol. 31, No. 1, pp. 1-26.

Keidar, I. et al. "On the Cost of Fault-Tolerant Consensus When There Are No Faults" ACM SIGNACT News, Jun. 2001, vol. 32, No. 2, pp. 45-63.

Kumar, A. et al. "Semantics Based Transaction Management Techniques for Replicated Data" Proceedings of the 1988 ACM SIGMOD International Conference on Management of Data (SIGMOD '88), Jun. 1988, vol. 17, No. 3, pp. 117-125.

Lamport, L. "Paxos Made Simple" ACM SIGACT News, Nov. 1, 2001, Title page, Table of Contents, pp. 1-11.

Lampson, B.W. "The ABCDs of Paxos" Presented at the Principles of Distributed Computing, 2001, Title Page, pp. 1-25, also located at http://research.microsoft.com/Lampson/65-ABCSPaxos/Abstract.html.

Rabinovich, M. et al. "A Fault-Tolerant Commit Protocol for Replicated Databases" Proceedings of the 11th ACM SIGACT-SIGMOD-SIGART Symposium on Principles of Database Systems (PODS '92), San Diego, CA, Jul. 1992, pp. 139-148.

Sergent, N. et al. "Impact of a Failure Detection Mechanism on the Performance of Consensus" Proceedings of the 2001 Pacific Rim International Symposium on Dependable Computing (PRDC '01), Dec. 17-19, 2001, pp. 137-145.

Thomas, R.H. "A Majority Consensus Approach to Concurrency Control for Multiple Copy Databases" ACM Transactions on Database Systems, Jun. 1979, vol. 4, No. 2, pp. 180-209.

Yang, J. et al. "Structured Derivations of Consensus Algorithms for Failure Detectors" Proceedings of the 17th Annual ACM Symposium on Principles of Distributed Computing (PODC '98), Puerto Vallarta, Mexico, 1998, pp. 297-306.

* cited by examiner

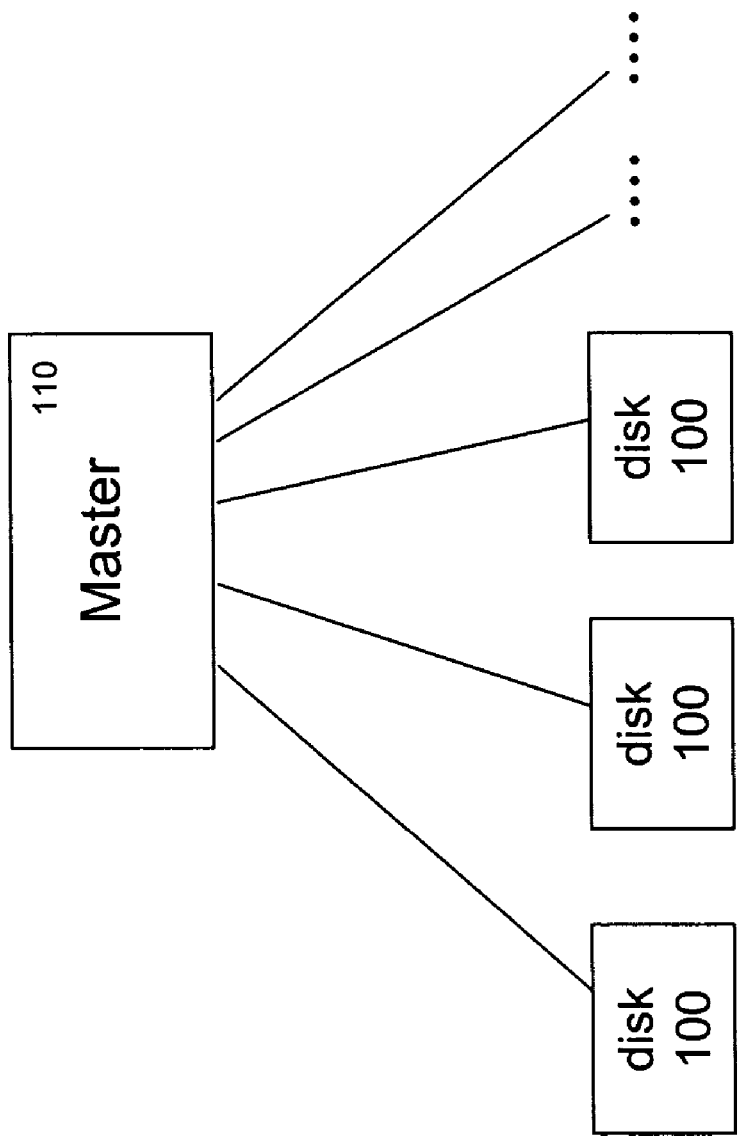

DYNAMIC DISTRIBUTED CONSENSUS ALGORITHM

FIELD

Embodiments of the invention relate generally to the field of distributed data management and, in particular, to management of data availability in distributed data storage systems.

BACKGROUND OF THE INVENTION

Data processing systems require efficient data storage means to ensure successful operation of the system. Data not only needs to be available upon request, but also must be accurate and represent the latest version upon retrieval. Methods of storing replicas of data on different storage entities are usually utilized to provide back-up copies of data during unexpected storage entity failures. However, since the storage entities may fail while updating data replicas, there is a need for algorithms providing retrieval of the most recent successful update, i.e. algorithms providing a consensus on the value stored in the system, independently of the failed storage entities.

There are several distributed consensus algorithms currently utilized in the industry. One of the algorithms is the Butler Lampson extension of a well-known Paxos algorithm. The Butler Lampson consensus algorithm requires data to be replicated on all the data storage entities in a system. Most of the time, there is no need for such a large number of data replicas. Moreover, replication of data on all the data storage entities present in the system becomes resource and time consuming operation and impedes scalability of the system if a number of storage entities is large. In addition, a failure of each storage entity in the system reduces data availability, because the number of data storage entities storing a data replica decreases with each failure. What is needed, therefore, is a solution that overcomes these and other shortcomings of the prior art.

SUMMARY OF THE INVENTION

A method and apparatus for data management are disclosed. Embodiments of the invention include relocating data from a first storage device from a subset of a plurality of storage devices to a second storage device from the plurality of storage devices upon unavailability of the first storage device during a data operation, wherein each storage device from the subset of the plurality of storage devices includes a instance of consensus data. Embodiments of the invention further include updating status parameters on each storage device from the subset of the plurality of storage devices, wherein a subset of the status parameters indicates addition of the second storage device to the plurality of storage devices.

BRIEF DESCRIPTION OF THE DRAWINGS

The invention is illustrated by way of example and not limitation in the figures of the accompanying drawings, in which like references indicate similar elements and in which:

FIG. 1A illustrates an exemplary system architecture according to one embodiment of the invention;

DETAILED DESCRIPTION

Methods and apparatuses for distributed data systems are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

It will be appreciated that the term "disk," as used herein, means a direct access storage device, for example, a floppy disk, hard disk, magnetic disk, optical disk, etc. It will be further appreciated that the term "consensus data," as used herein, means data that is replicated on a number of disks. It will be further appreciated that the term "clique," as used herein, means a set of disks holding the same version of the consensus data. The term "incarnation," as used herein, means a version of the consensus data. The term "disk relocation" refers to an operation of copying consensus data from one disk onto another. The above terms are defined by way of example and not limitation.

Exemplary Architecture

Figure 1B:
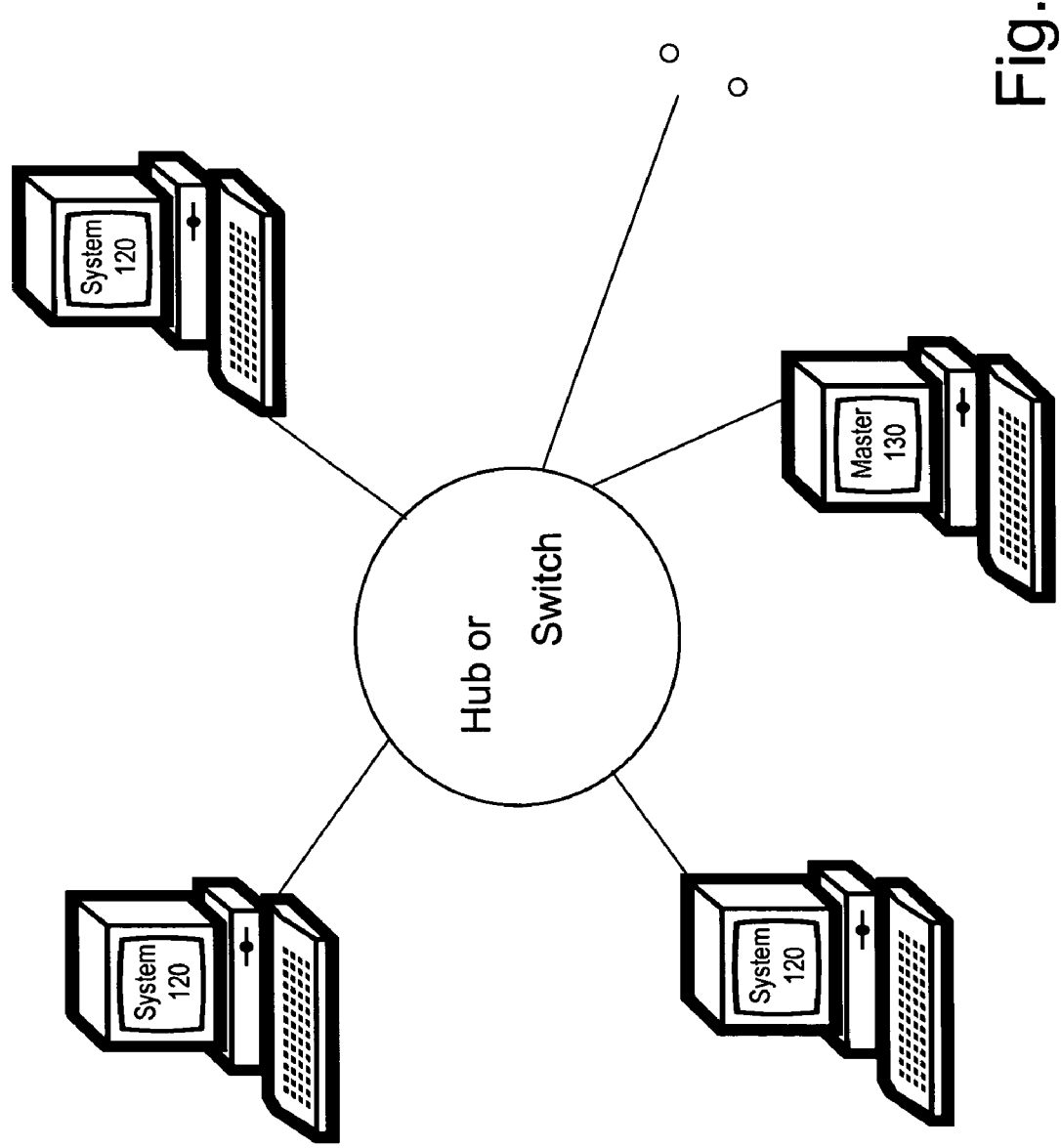
FIG. 1B illustrates an exemplary system architecture according to one embodiment of the invention.

In one embodiment of the invention, a plurality of disks 100 of FIG. 1A are controlled by a master module 110. The master module 110 controls update and retrieve operations of consensus data stored on the plurality of disks as discussed in detail below. In one embodiment, the master module 110 resides on a processing system. It will be appreciated that the invention is not limited to the architecture illustrated in FIG. 1A. For example, a plurality of processing systems 120 of FIG. 1B are controlled by a master processing system 130 according to another embodiment of the invention. Although embodiments of the invention are described with reference to the above described exemplary system architecture for ease of understanding, embodiments are not limited to this system architecture and provide synchronization of data replicas in any distributed systems. As will be apparent to one skilled in the art from the following discussion, embodiments of the invention, for example, provide synchronization of data packets broadcasted to multiple network nodes, or synchronization of data stored on different processing systems in a local area network, etc.

Brief Introduction to Data Synchronization Algorithms

Introduction to distributed consensus algorithms may be helpful for ease of understanding embodiments of the invention.

As mentioned above, several consensus algorithms exist in the industry that ensure data synchronization in presence of storage entity failures distributed systems. For example, Butler Lampson extension of the well-known Paxos consensus algorithm provides a distributed consensus algorithm ensuring accurate data versioning even when failures of storage entities in a distributed system occur. The algorithm requires consensus data to be replicated on all disks in the system.

According to the Butler Lampson extension, each instance of the replicated consensus data is associated with a set of parameters referenced during data update and retrieve operations. Specifically, consensus data on each disk is associated with parameters $next_i$ and $last_i$ wherein i identifies the disk. Thus, consensus data on Disk1 is associated with parameters $next_1$ and $last_1$. In addition, the master module 110 maintains a parameter master next that is used in updating the $next_i$ and $last_i$ parameters. The functions of these parameters will be apparent from the following discussion. The disk parameters are required to survive system crashes. The master parameters, on the other hand, do not have to survive system crashes. The Butler Lampson algorithm requires that initially parameters $next_i$, $last_i$ and master next be set to the same value, for example, to the value of 0.

Figure 2:
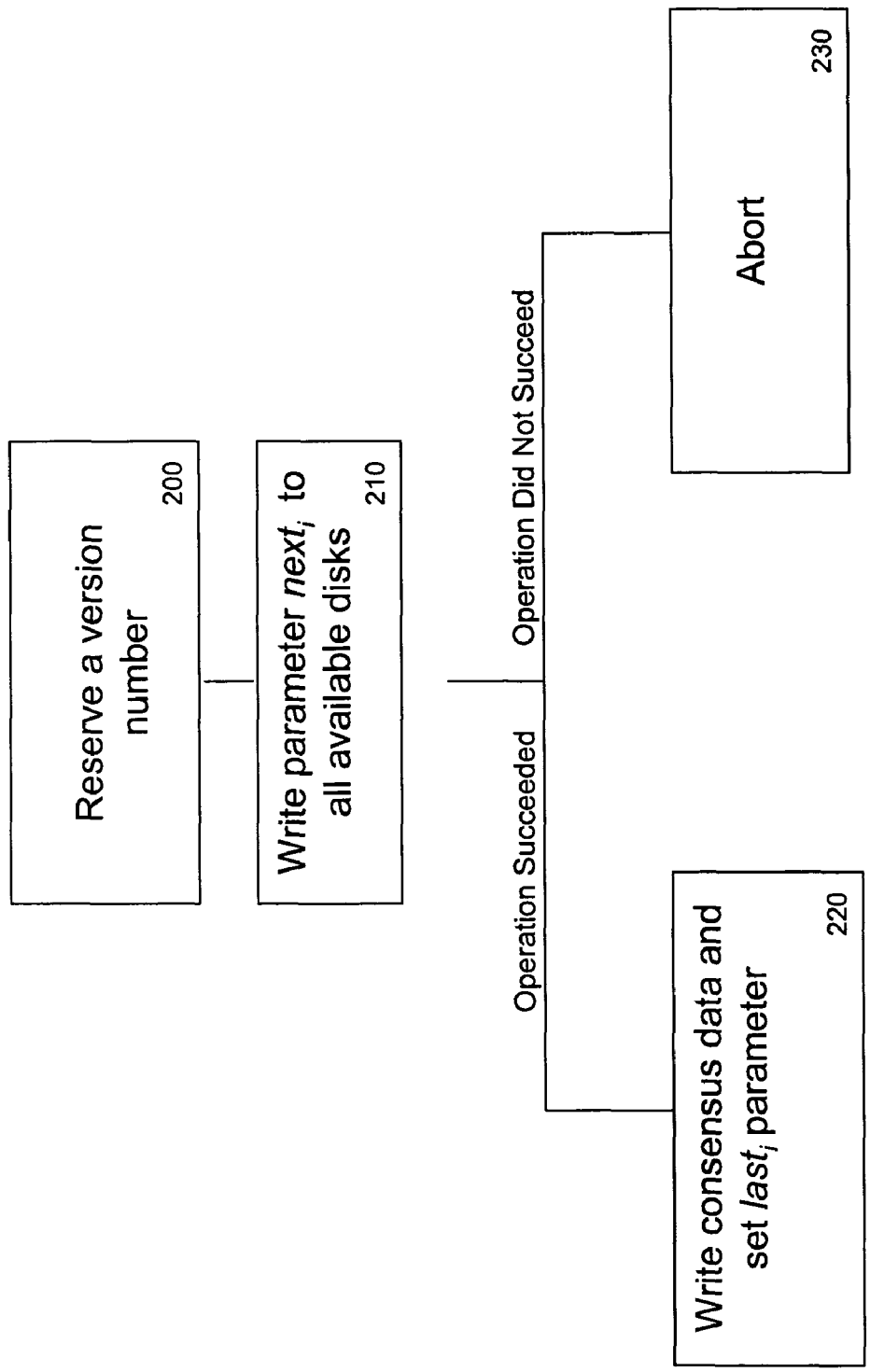
FIG. 2 is a flow chart of a conventional data update operation.

The update operation of the Butler Lampson algorithm is described with reference to FIG. 2. At 200 the master module 110 reserves a version number for the update of the consensus data by incrementing a parameter master next by one. At 210 the master module 110 writes the updated value of the parameter master next all available disks as parameter $next_i$. For example, the value of the parameter master next is written on Disk 1 as a parameter $next_1$. If this write operation does not succeed on the majority of all the disks in the system, the update operation is aborted at 230; It will be appreciated that the number of the disks comprising the majority is determined with the respect to a fixed clique size. However, if the write operation succeeds on the majority of the disks, then at 220 the master module writes consensus data on each disk and sets parameter $last_i$, associated with the consensus data on each disk with the value of the parameter master next.

Figure 3:
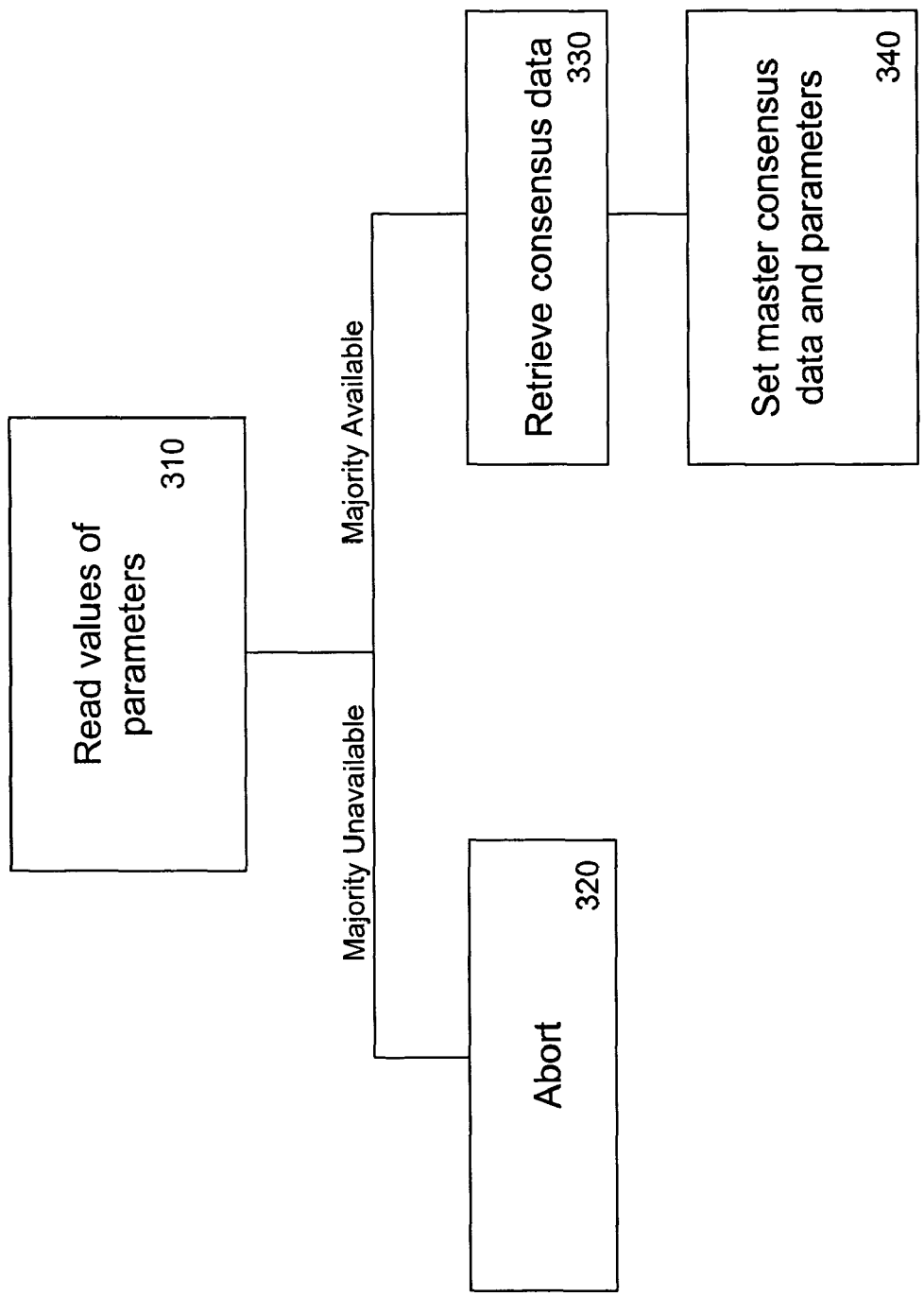
FIG. 3 is a flow chart of a conventional data retrieve operation.

The data retrieve operation is described with reference to FIG. 3. At 310, the master module 110 reads the values of $next_i$ and $last_i$ from all the disks of the system. The retrieve operation fails and is aborted at 320 if the majority of disks is unavailable. If the majority of disks is available, at 330 the consensus data of a disk with the maximal value of $last_i$ parameter is retrieved. The retrieved consensus data is maintained by the master module 110 as master consensus data and thus, at 340 the master module 110 sets master consensus data to the contents of the consensus data retrieved from the disk with a maximal value of parameter $last_i$. In addition, the master module 100 sets the value of the master next parameter to a maximal value of $next_i$ found on any available disk to ensure that during the subsequent update operation the value of master next reflects the correct data version number.

Figure 4:
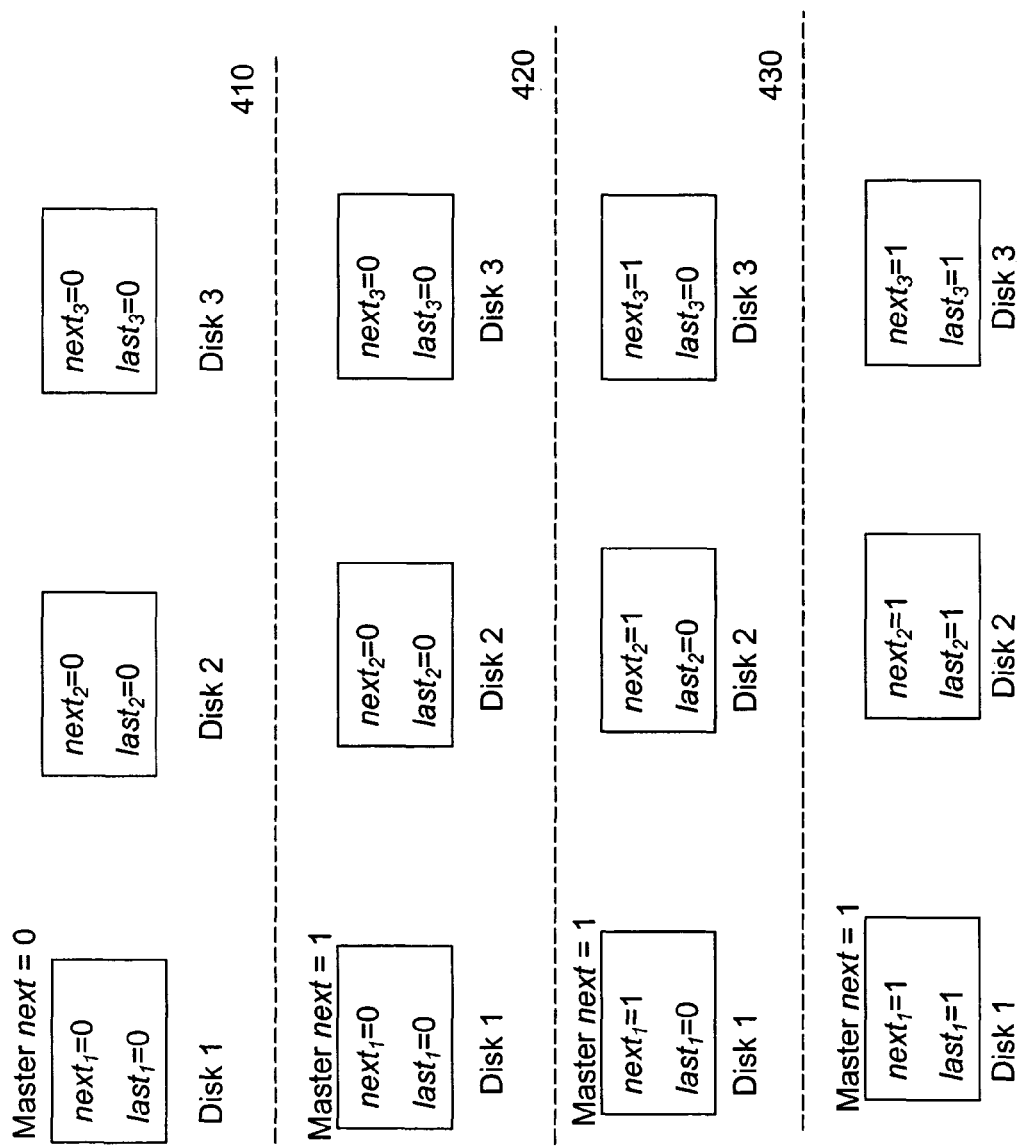
FIG. 4 illustrates values of status parameters during a conventional data update operation.

FIG. 4 illustrates an example of the above-described consensus data update operation of the Butler Lampson consensus algorithm. The illustrated system includes three disks: Disk 1, Disk 2 and Disk 3. Prior to any updates of the consensus data stored at the disks, the values of the parameter master next and parameters $next_1$, $next_2$, $next_3$ and $last_1$, $last_2$, $last_3$ on all the disks are set to 0, as illustrated in 410 of the Figure. During the first step of the consensus data update operation, the master module 110 increments the value of the master next by one, as illustrated in 420. In the next step, the master module 110 sets the values of $next_1$, $next_2$ and $next_3$ to the value of the master next, which is 1, as illustrated in 430. During the final step the master module updates the consensus data on each disk and sets the values of $last_1$, $last_2$, and $last_3$ in 440 to the values of master next, which is also set to 1 in this example. If during any phase of the update operation, the majority of the disks, i.e., two of the three disks, are unavailable, the update operation fails and is aborted. However, if only one disk, for example, Disk 1, is unavailable, the update operation does not fail, because the majority of the disks, Disk 2 and Disk 3, are available.

The described update and retrieve operations of the Butler Lampson consensus algorithm are well known in the art and no further details are necessary. Please note that in the Butler Lampson algorithm, data availability is reduced with a failure of each disk, as the number of available disks storing the consensus data is reduced.

Methodology

With these concepts in mind embodiments of the invention can be further described.

According to one embodiment of the invention, consensus data is replicated on a subset of system disks. The subset of the disks includes a predetermined number of disks which constitute a clique. The number of disks in the clique is based on the desired degree of fault tolerance; greater number of disks in the clique provide higher degree of fault tolerance.

In one embodiment of the invention, disks in the clique can be replaced with other disks from outside the clique. This replacement can take place in response to a disk failure during a read or write operation, or in response to a removal of a functioning disk from the system for administrative reasons. A disk may fail for a variety of reasons, for example, internal disk failure, unavailability of a communication channel utilized by the disk, etc. A disk may also be removed based on a number of administrative reasons, for example, due to disk model upgrade, preventive replacement of a poorly performing disk or provisions of the disk with a different application. In order to simplify the following description, a failed or removed system disk is referred to as "source disk" in the following discussion.

In one embodiment the disk replacement takes place by copying consensus data and its associated parameters from the source disk of a clique to a disk that does not belong to the clique. This copying operation is referred to as "relocation." If more than one disk in the clique has failed or is removed for administrative reasons, the relocation process described below is performed in parallel for all of them as long as the source disks represent a minority of all the disks. For simplicity of explanation, the following text describes a relocation of a single disk.

The update and retrieve operations of the consensus data are described below according to embodiments of the invention.

Data Update Operation with Relocation

According to one embodiment of the invention, in addition to the parameters $last_i$ and $next_i$, each disk storing an instance of the consensus data, includes a $list_i$ parameter, an $incarnation_i$ parameter and a $proxy_i$ parameter. As defined above, clique is a set of disks that currently stores a copy of the consensus data. The $list_i$ parameter lists disk members of the clique to which disk number i belongs. The $incarnation_i$ parameter specifies the clique version. In one embodiment upon each disk relocation, the $incarnation_i$ parameter is incremented on all current clique disks. The $proxy_i$ parameter identifies a disk, if any, for which the disk number i acts as a proxy.

In one embodiment, the master module 110 maintains a parameter master list that identifies disks in the most recent clique. The master module 110 also maintains a parameter master incarnation that contains the most recent clique incarnation value.

In one embodiment of the invention, prior to the first relocation, the $list_i$ parameter of each disk of the current clique and the master list parameter identify disks of the current, i.e.

default, clique. The parameters $next_i$, $last_i$ and $incarnation_i$ on the disks of the clique and master next and master incarnation parameters are set to a common value on all disks in the clique, for example to the value of 0. The parameter $proxy_i$ of each disk of the current clique is not set to any value because no relocation took place yet. In one embodiment, disks outside of the clique do not include an instance of the consensus data, nor do they include any of the associated parameters.

Figure 5:
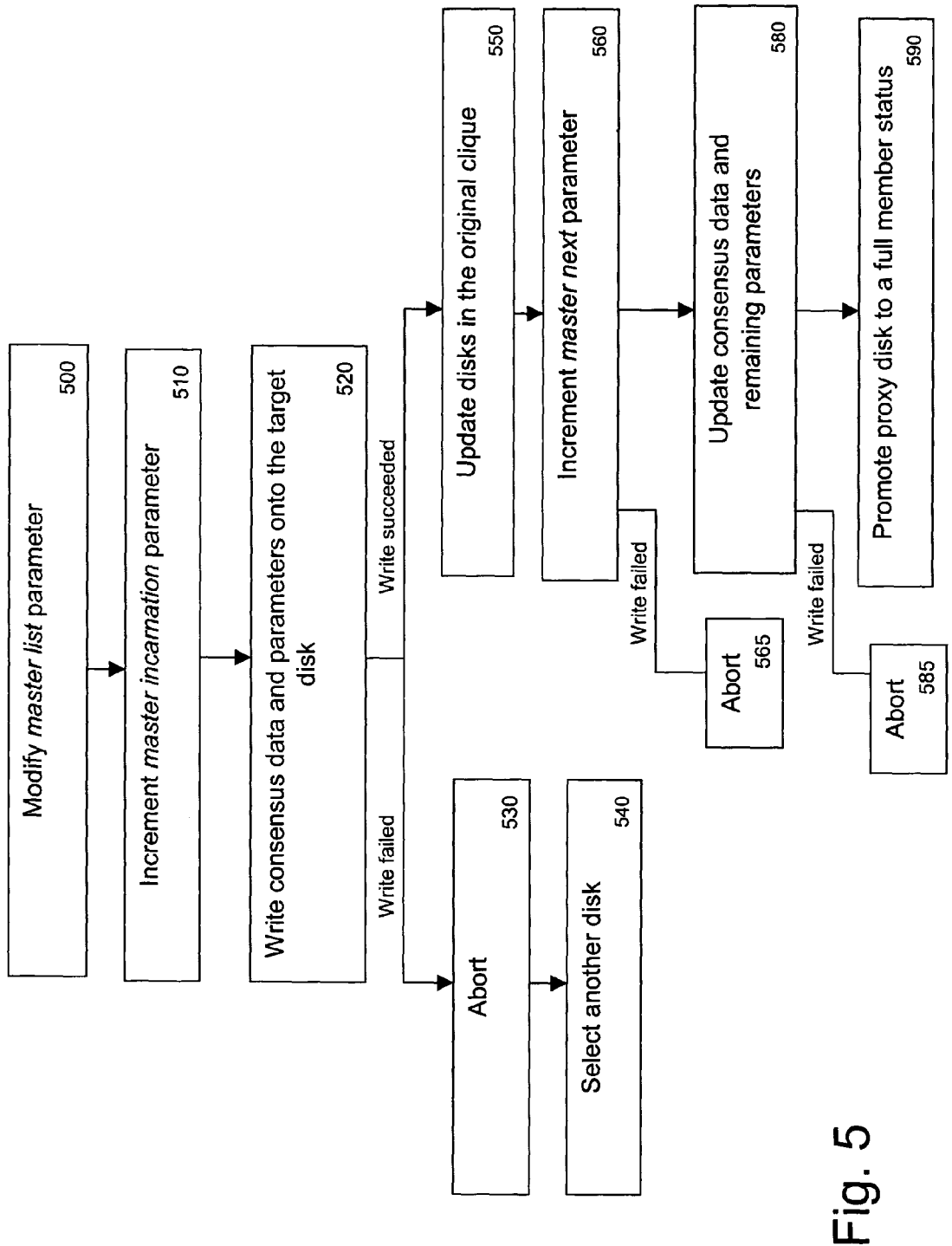
FIG. 5 is a flow chart of a data update operation according to one embodiment of the invention.

In case of a disk failure, relocation is performed by updating the $list_i$, $incarnation_i$ and $proxy_i$ parameters on all the available disks in the clique and the destination disk. As used herein, a destination disk is a disk that replaces a source disk and to which an instance of the consensus data along with its associated parameters is copied. In one embodiment, the update operation is performed in three phases, which are described with reference to FIG. 5.

During the first phase the master module 110 makes the destination disk a proxy of the source disk to be replaced. At 500 the master module 110 modifies the master list parameter to exclude identification of the source disk and include identification of the destination disk. For example, if Disk 1 has failed or is removed, and Disk 4 is selected to replace Disk 1, then the master module 110 removes identification of Disk 1 from the master list parameter and includes identification of Disk 4. At 510 the master module 110 increments the value of the master incarnation parameter by one to reflect that a relocation has taken place. In addition, at 520 the master module 110 writes the contents of the master consensus data onto the destination disk. Parameters $next_i$ and $last_i$ on the destination disk are set to the value of the master next parameter. In addition, the master module 110 writes the $list_i$ parameter on the destination disk and sets its value to the value of master list parameter. The master module 110 also writes $incarnation_i$ parameter onto the destination disk and sets it to the value of the master incarnation parameter. Further, the $proxy_i$ variable on the destination disk is set to identify the source disk, i.e., a disk that the destination disk replaces.

In one embodiment, at 530 if the write operation of the consensus data and its associated parameters to the destination disk fails, the current update operation fails and is aborted. At 540 the master module 110 retries the update operation with another destination disk.

If the write operation on the destination disk succeeds, the second phase of the update operation proceeds to form a new clique by excluding the source disk and including the destination disk. At 550 the second phase of the update operation is accomplished by updating only the disks in the original clique, i.e., including the replaced disk and excluding the destination disk, according to one embodiment of the invention. The second phase of the update operation is accomplished in two steps. During the first step, at 560 the master module 110 increments the value of master next parameter and subsequently the $next_i$ parameters on each disk of the original clique by setting them to the value of master next parameter. The first step fails and the entire update operation is aborted at 565 if the update does not succeed at least on the majority of disks in the old clique. During the second step at 580 the master module 110 updates on each disk in the old clique parameters $last_i$ to the value master next, $list_i$ to the value master list, and $incarnation_i$ to the value master incarnation. At the same time, the master module 110 also updates the consensus data on each disk in the old clique. Parameters $proxy_i$ are left unmodified, i.e., the proxy parameters remain not set. The second step fails and the entire update operation is aborted at 585 if the update does not succeed at least on the majority of disks in the old clique. It will be appreciated that once the second phase successfully completes, the source disk is permanently excluded from the clique and replaced by the proxy disk. If, on the other hand, the second phase fails, the new clique is not formed.

In one embodiment at 590 the third phase of the relocation operation promotes the destination disk from a proxy to a full member of the clique. This is achieved by clearing the parameter $proxy_i$ on the destination disk. Even if the write to the destination disk fails, the update operation remains successfully executed. In such a case, the destination disk remains a proxy for the source disk in the current clique. The latter however, cannot belong to the new clique since it has been excluded during the second phase.

In another embodiment, in order to minimize the disparity between parameters $next_i$ and $last_i$ among the disks in the clique, all the disks in the clique are updated.

It will be appreciated that the $proxy_i$ parameter is used when relocations happen for administrative reasons and the source disk relocated in fact has not failed. In the second phase of the update operation the source disk is excluded from the old clique. Should this happen without including the proxy disk in the clique, the availability of the system would be (artificially) reduced although no disk has failed. However, the destination disk and the source disk should not be included in the same clique, as otherwise the clique would contain one extra disk than the predefined maximum number of allowed disks in a clique and the number of disks constituting the majority would not correspond to the predefined number of disks constituting the majority. Thus, the destination disk is included as a proxy for the source disk, and not as a member of the clique.

Figure 6:
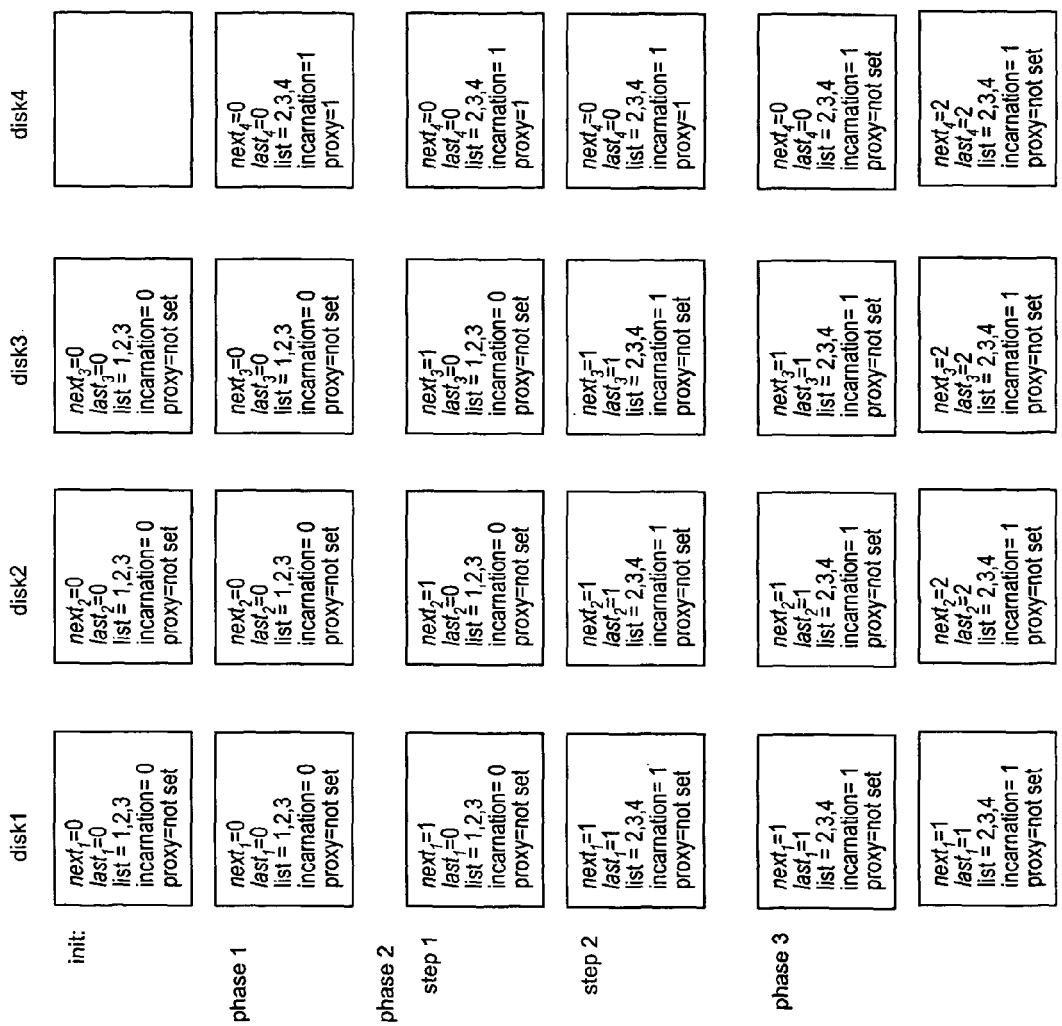
FIG. 6 illustrates values of status parameters during an update data operation according to one embodiment of the invention.

FIG. 6 illustrates values of the parameters stored at each disk of the new clique and the old clique at each phase of the update operation according to one embodiment of the invention.

Data Retrieve Operation with Relocation

Figure 7:
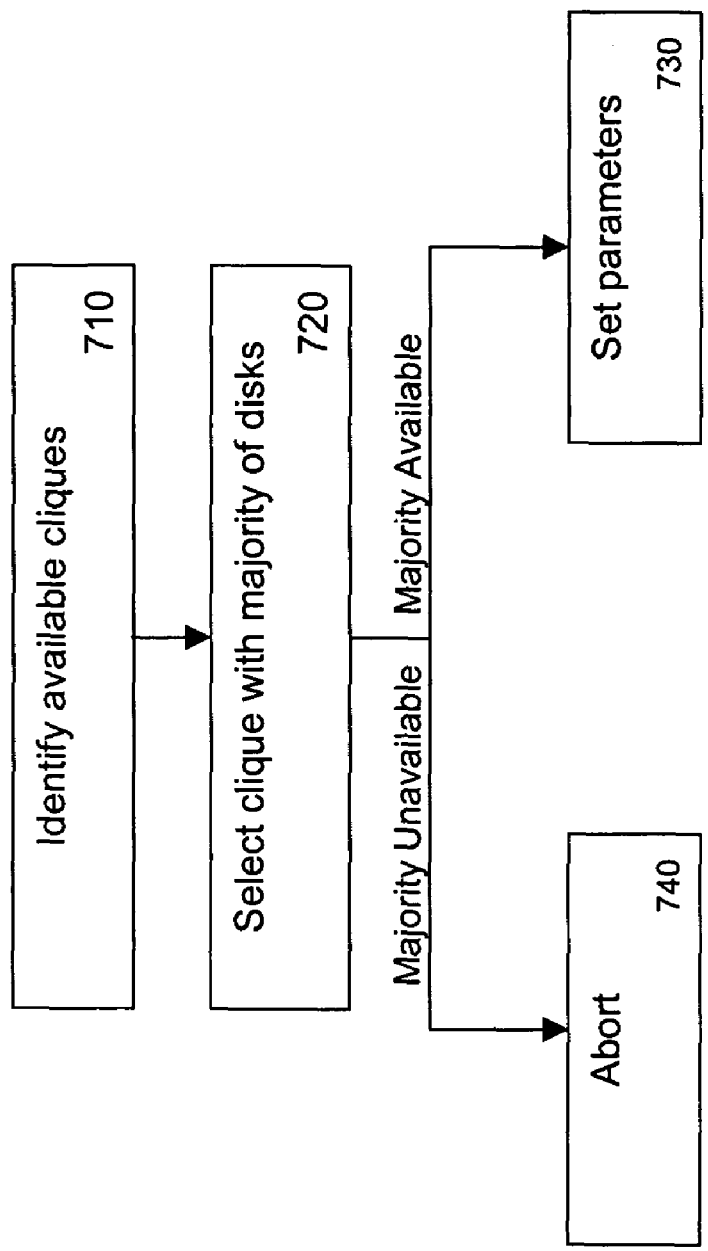
FIG. 7 is a flow chart of a data retrieve operation according to one embodiment of the invention.

The retrieve operation is described with reference to FIG. 7 according to one embodiment of the invention. At 710, the master module 110 identifies all available cliques by examining $list_i$ and $incarnation_i$ parameters of each disk including an instance of the consensus data. In one embodiment disks that mutually list each other in their $list_i$ parameters and have the same value of $incarnation_i$ parameter form one clique. In particular, disks that do not list their identifier in their own $list_i$ parameter are not members of any clique. Thus, at the end of the update operation illustrated in FIG. 6, the master module 110 identifies clique containing disks 2, 3, and 4 and since disk 1 does not identify itself in its $list_1$ parameter, disk 1 does not belong to any clique.

If one or more disks of the clique are unavailable, proxy disks may be accessed. For example, if the third phase of the update operation has been aborted, then $proxy_i$ value may be set on one of the disks in the clique; and it is possible to use disk number 4, for example, as a replacement for disk 1 if, parameter $proxy_1$ is set to 1 and disk number 1 is either unavailable or does not have its own identification "1" in its $list_1$ parameter, as illustrated in phase 2 if FIG. 6. It will be appreciated that in one embodiment at most one proxy can be used for each disk. If there are multiple proxies for a single disk that is not available, the proxy with the maximal disk number is used.

At 720 the master module 110 selects the clique which contains the majority of disks. As stated above the update operation fails if the majority of disks was not available and thus relocation is possible only from disks that represent the minority, which ensures that there will be only one clique containing the majority of disks.

At 730, upon selecting the clique with the majority of disks, the master module 110 sets the content of the master consensus data to the consensus data retrieved from a disk of the clique with the maximal value of parameter $last_i$. For example, continuing with the example illustrated in FIG. 6, the master module 110 retrieves consensus data from any of the disks 2, 3 or 4 and their $last_i$ parameter is of a maximal value. The master module 110 sets the master next parameter to the maximal parameter $next_i$, which is illustrated in FIG. 6 as $next_2$, $next_3$ or $next_4$. The master module 110 also sets the master list and incarnation variables to the corresponding values of $list_i$ and $incarnation_i$ parameters of the majority, which is the same on all disk in the clique, for example, in the clique consisting of disks 2, 3 and 4 of FIG. 6. In one embodiment if the majority of the disks in the clique is not available, then the retrieve operation fails at 740.

In one embodiment of the invention, if one or more disks fail during a retrieve operation, the disks are replaced by relocating to different disks as described above. If the majority of the disks fail, the retrieve operations is aborted.

General

Figure 8:
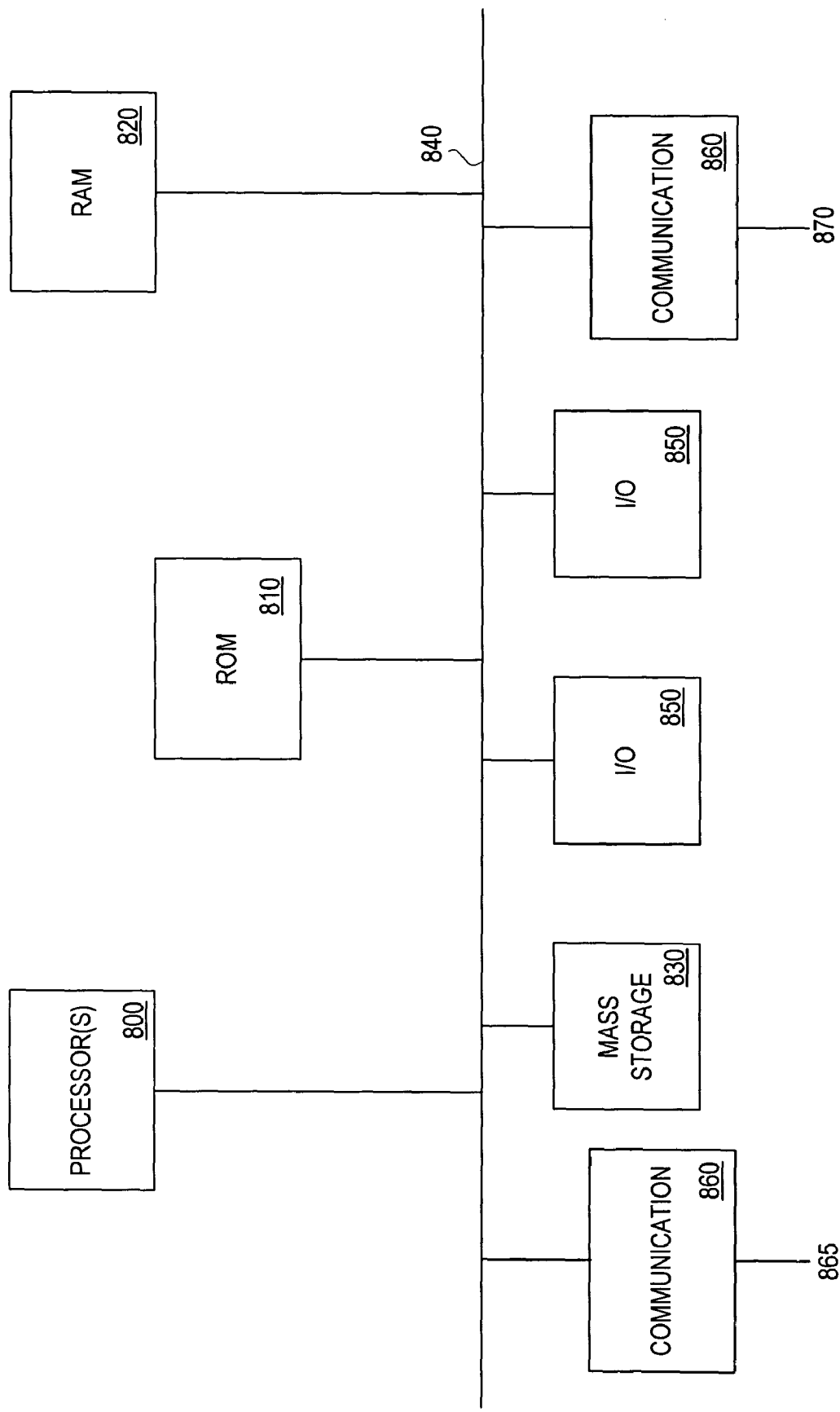
FIG. 8 illustrates a conventional processing system.

It will be appreciated that physical processing systems, which embody components of the archiving system described above, may include processing systems such as conventional personal computers (PCs), embedded computing systems and/or server-class computer systems according to one embodiment of the invention. FIG. 8 illustrates an example of such a processing system at a high level. The processing system of FIG. 8 may include one or more processors 800, read-only memory (ROM) 410, random access memory (RAM) 820, and a mass storage device 830 coupled to each other on a bus system 840. The bus system 840 may include one or more buses connected to each other through various bridges, controllers and/or adapters, which are well known in the art. For example, the bus system 840 may include a 'system bus', which may be connected through an adapter to one or more expansion buses, such as a peripheral component interconnect (PCI) bus or an extended industry standard architecture (EISA) bus. Also coupled to the bus system 840 may be the mass storage device 830, one or more input/output (I/O) devices 850 and one or more data communication devices 860 to communicate with remote processing systems via one or more communication links 865 and 870, respectively. The I/O devices 850 may include, for example, any one or more of: a display device, a keyboard, a pointing device (e.g., mouse, touch pad, trackball), and an audio speaker.

The processor(s) 800 may include one or more conventional general-purpose or special-purpose programmable microprocessors, digital signal processors (DSPs), application specific integrated circuits (ASICs), or programmable logic devices (PLD), or a combination of such devices. The mass storage device 830 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 860 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

The term "computer-readable medium", as used herein, refers to any medium that provides information or is usable by the processor(s). Such a medium may take may forms, including, but not limited to, non-volatile and transmission media. Non-volatile media, i.e., media that can retain information in the absence of power, includes ROM, CD ROM, magnetic tape and magnetic discs. Volatile media, i.e., media that cannot retain information in the absence of power, includes main memory. Transmission media includes coaxial cables, copper wire and fiber optics, including the wires that comprise the bus. Transmission media can also take the form of carrier waves, e.g., electromagnetic waves that can be modulated, as in frequency, amplitude or phase, to transmit information signals. Additionally, transmission media can take the form of acoustic or light waves, such as those generated during radio wave and infrared data communications.

It will be recognized that many of the features and techniques described above may be implemented in software. For example, the described operations may be carried out in a processing system in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry or firmware may be used in place of software, or in combination with software, to implement the features described herein. Thus, the invention is not limited to any specific combination of hardware circuitry and software, nor is it limited to any particular source of software executed by the processing systems.

Thus, methods and apparatuses for data management have been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. A computer-implemented method for ensuring data synchronization by reaching a consensus on the data stored in a subset of a plurality of storage devices in a distributed system, the computer implemented method comprising:

relocating consensus data from a first storage device from the subset of the plurality of storage devices to a second storage device not from the subset of the plurality of storage devices upon unavailability of the first storage device, wherein the consensus data on the second storage device is associated with a plurality of status parameters, the plurality of status parameters comprising a list parameter for listing members of the subset, an incarnation parameter for specifying a version of the subset and a proxy parameter for identifying whether the second storage device is a proxy of the first storage device;

updating a second status parameter associated with other consensus data of at least one other storage device from the subset of the plurality of storage devices, wherein the second status parameter indicates an addition of the second storage device to the subset of the plurality of storage devices and an exclusion of the first storage device from the subset of the plurality of storage devices such that the subset after the act of updating comprises the second storage device, wherein the act of updating the plurality of status parameters comprises using a processor;

determining the consensus based at least in part upon the consensus data from the second storage device from the subset of the plurality of storage devices with the other consensus data of the subset, wherein the second storage device comprises the consensus data that was relocated from the first storage device and the second storage device was added to the subset upon the unavailability of the first storage device; and storing the consensus data in a volatile or non-volatile computer readable medium or displaying the consensus data on a display device.

2. The method of claim 1 wherein the second status parameter indicates removal of the first storage device from the plurality of storage devices.

3. The method of claim 1 wherein the subset of the plurality of storage devices includes a predetermined number of storage devices comprising instances of the consensus data.

4. The method of claim 1 wherein the act of updating includes writing the plurality of status parameters onto the second storage device.

5. The method of claim 4 wherein the writing the plurality of status parameters onto the second storage device comprises setting the proxy parameter to identify the first storage device.

6. The method of claim 1 wherein the act of updating the includes updating a third status parameter to reflect new clique members.

7. The method of claim 1 wherein the act of updating includes updating consensus data version parameters.

8. The method of claim 7 wherein the consensus data version parameters include two parameters.

9. The method of claim 1 wherein the act of relocating occurs during a data operation.

10. The method of claim 1 wherein the data operation is a data retrieve operation or is a data update operation.

11. The method of claim 1, wherein the subset of the plurality of storage devices comprises at least two of the storage devices.

12. A computer-implemented method for retrieval of data replicated on a set of data storage devices by a master having a master consensus data, the method comprising:

identifying a plurality of cliques of data storage devices, the data storage devices storing instances of consensus data, wherein a clique includes data storage devices storing an identical version of the consensus data, wherein the instances of consensus data are associated with a plurality of status parameters, the plurality of status parameters comprising a list parameter for listing members of the subset, an incarnation parameter for specifying a version of the subset and a proxy parameter for identifying whether the second storage device is a proxy of the first storage device;

selecting the clique from the identified cliques with majority of storage devices available;

retrieving a copy of the consensus data and status information from the storage devices in the selected clique based at least in part upon a value;

setting the master consensus data to the retrieved copy of the consensus data and status information, wherein the master consensus data is set by using a processor based at least in part upon the value, wherein the clique comprises a storage device that was added to the clique upon the unavailability of another storage device of the clique, the storage device comprising relocated consensus data and status information from the another storage device such that the relocated consensus data of the second storage device is adapted to be used to reach a consensus with other consensus data of the clique; and storing the master consensus data in a computer-readable medium or displaying the master consensus data on a display device.

13. The method of claim 12 wherein a data retrieve operation fails if there is no clique with the majority of storage devices available.

14. The method of claim 12 further comprising accessing proxy storage devices if a storage device of a clique is not available.

15. An article of manufacture comprising:

a computer-readable medium having a volatile or non-volatile medium, the computer-readable medium having stored therein instructions which, when executed by a processor, cause a processing system to perform a method comprising:

relocating consensus data from a first storage device from a subset of a plurality of storage devices to a second storage device not from subset of the plurality of storage devices upon unavailability of the first storage device, wherein the consensus data on the second storage device is associated with a plurality of status parameters, the plurality of status parameters comprising a list parameter for listing members of the subset, an incarnation parameter for specifying a version of the subset and a proxy parameter for identifying whether the second storage device is a proxy of the first storage device;

updating a second status parameter associated with other consensus data of at least one other storage device from the subset of the plurality of storage devices, wherein the second status parameter indicates an addition of the second storage device to the subset of the plurality of storage devices and an exclusion of the first storage device from the subset of the plurality of storage devices such that the subset after the act of updating comprises the second storage device;

determining a consensus based at least in part upon the consensus data from the second storage device from the subset of the plurality of storage devices with the other consensus data of the subset, wherein the second storage device comprises the consensus data that was relocated from the first storage device and the second storage device was added to the subset upon the unavailability of the first storage device; and storing the consensus data or displaying the consensus data on a display device.

16. The article of manufacture of claim 15 wherein the instructions, which when executed by the processor, cause the processing system to perform the method further comprising the second status parameter indicating removal of the first storage device from the plurality of storage devices.

17. The article of manufacture of claim 15 wherein the instructions, which when executed by the processor, cause the processing system to perform the method wherein the subset of the plurality of storage devices includes a predetermined number of storage devices comprising instances of the consensus data.

18. The article of manufacture of claim 15 wherein the instructions, which when executed by the processor, cause the processing system to perform the method wherein the updating includes writing the plurality of status parameters onto the second storage device.

19. The article of manufacture of claim 15 wherein the instructions, which when executed by the processor, cause the processing system to perform the method wherein the writing the plurality of status parameters onto the second storage device comprises setting the proxy parameter to identify the first storage device.

20. The article of manufacture of claim 15 wherein the instructions, which when executed by the processor, cause the processing system to perform the method wherein the act of updating occurs during a data operation.

21. The article of manufacture of claim 15 wherein the instructions, which when executed by the processor, cause the processing system to perform the method wherein the data operation is a data update operation or is a data retrieve operation.

22. The article of manufacture of claim 15, wherein the subset of the plurality of storage devices comprises at least two of the storage devices.

23. An apparatus comprising:
one or more processors for:
relocating consensus data from a first storage device from a subset of a plurality of storage devices to a second storage device not from the subset of the plurality of storage devices upon unavailability of the first storage device, wherein the consensus data on the second storage device is associated with a plurality of status parameters, the plurality of status parameters comprising a list parameter for listing members of the subset, an incarnation parameter for specifying a version of the subset and a proxy parameter for identifying whether the second storage device is a proxy of the first storage device;
updating a second status parameter associated with other consensus data of at least one other storage device from the subset of the plurality of storage devices, wherein the second status parameter indicates an addition of the second storage device to the subset of the plurality of storage devices and an exclusion of the first storage device from the subset of the plurality of storage devices such that the subset after the act of updating comprises the second storage device; and
determining a consensus based at least in part upon the consensus data from the second storage device from the subset of the plurality of storage devices with the other consensus data of the subset, wherein the second storage device comprises the consensus data that was relocated from the first storage device and the second storage device was added to the subset upon the unavailability of the first storage device; and
a volatile or non-volatile computer readable medium for storing the consensus data or a display device for displaying the consensus data.

24. The apparatus of claim 23 wherein the second status parameter indicates removal of the first storage device from the plurality of storage devices.

25. The apparatus of claim 23 wherein the subset of the plurality of storage devices includes a predetermined number of storage devices comprising instances of the consensus data.

26. The apparatus of claim 23 wherein the one or more processors for updating is further adapted for writing the plurality of status parameters onto the second storage device.

27. The apparatus of claim 26 wherein the one or more processors for writing the plurality of status parameters onto the second storage device is further adapted for setting the proxy parameter to identify the first storage device.

28. The apparatus of claim 23 wherein the one or more processors for updating is further adapted for updating the status parameter to reflect new clique members.

29. The apparatus of claim 23 wherein the act of relocating occurs during a data operation.

30. The apparatus of claim 23 wherein the data operation is a data update operation or is a data retrieve operation.

31. The apparatus of claim 23, wherein the subset of the plurality of storage devices comprises at least two of the storage devices.

32. An apparatus comprising:
a master module having a processor to perform a data operation on a subset of storage devices from a plurality of storage devices;
the master module to relocate data from a first storage device from the subset of the storage devices to a second storage device not from the subset of the storage devices upon unavailability of the first storage device, wherein the consensus data on the second storage device is associated with a plurality of status parameters, the plurality of status parameters comprising a list parameter for listing members of the subset, an incarnation parameter for specifying a version of the subset and a proxy parameter for identifying whether the second storage device is a proxy of the first storage device;
the master module further to update second status parameter associated with other consensus data of at least one other storage device from the subset of the plurality of storage devices, wherein the second status parameter indicates an addition of the second storage device to the subset of the plurality of storage devices and an exclusion of the first storage device from the subset of the plurality of storage devices such that the subset after the act of updating comprises the second storage device; and
the master module for determining the consensus based at least in part upon the consensus data from the second storage device from the subset of the plurality of storage devices with the other consensus data of the subset, wherein the second storage device comprises the consensus data that was relocated from the first storage device and the second storage device was added to the subset upon the unavailability of the first storage device.

33. The apparatus of claim 32 wherein the act to relocate occurs during a data operation.

34. The apparatus of claim 32 wherein the data operation is a data update operation or is a data retrieve operation.

35. The apparatus of claim 32, wherein the subset of the plurality of storage devices comprises at least two of the storage devices.

* * * * *

UNITED STATES PATENT AND TRADEMARK OFFICE
CERTIFICATE OF CORRECTION

PATENT NO.       : 7,814,064 B2
APPLICATION NO.  : 10/845286
DATED            : October 12, 2010
INVENTOR(S)      : Radek Vingralek It is certified that error appears in the above-identified patent and that said Letters Patent is hereby corrected as shown below:

In column 3, line 28, delete "230;" and insert -- 230. --, therefor.

In column 9, line 24, in claim 6, after "updating" delete "the".

Signed and Sealed this
Seventeenth Day of May, 2011

David J. Kappos
*Director of the United States Patent and Trademark Office*